(12) United States Patent
Sanchez

(10) Patent No.: US 7,841,653 B2
(45) Date of Patent: Nov. 30, 2010

(54) INFANT CARRIER SUPPORT

(76) Inventor: Gary L. Sanchez, 3308 Don Quixote Dr., NW., Albuquerque, NM (US) 87104

( * ) Notice: Subject to any disclaimer, the term of this patent is extended or adjusted under 35 U.S.C. 154(b) by 77 days.

(21) Appl. No.: 12/177,918

(22) Filed: Jul. 23, 2008

(65) Prior Publication Data

US 2010/0019552 A1    Jan. 28, 2010

(51) Int. Cl.
A47C 4/52    (2006.01)
(52) U.S. Cl. .................... 297/183.3; 297/183.1; 24/3.12
(58) Field of Classification Search ............. 297/183.3, 297/183.8, 183.1, 183.4; 24/8, 3.12, 301, 24/326, 304, 3.1, 370, 907, 910; 224/673–680
See application file for complete search history.

(56) References Cited

U.S. PATENT DOCUMENTS

| | | | |
|---|---|---|---|
| 4,634,175 A | 1/1987 | Wise | |
| 4,901,898 A | 2/1990 | Colombo | |
| 4,915,277 A | 4/1990 | Larreategui | |
| 4,974,764 A * | 12/1990 | Cantwell | 224/269 |
| 5,184,375 A * | 2/1993 | Hoyt | 24/3.12 |
| 5,331,721 A | 7/1994 | Raum | |
| 5,375,749 A | 12/1994 | Oliva | |
| 5,441,186 A | 8/1995 | Halligan | |
| 5,571,228 A * | 11/1996 | McMurtrie | 43/21.2 |
| 5,619,774 A * | 4/1997 | Perry | 24/3.6 |
| 6,378,746 B1 * | 4/2002 | Miller | 224/258 |
| 6,484,365 B1 * | 11/2002 | Thompson | 24/3.12 |
| 6,938,304 B2 * | 9/2005 | Chen | 24/3.12 |
| 6,978,517 B2 * | 12/2005 | Collins et al. | 24/3.12 |
| 7,086,126 B2 * | 8/2006 | English | 24/301 |
| 7,175,061 B2 | 2/2007 | Dohn | |
| 2006/0011681 A1 * | 1/2006 | Raimondo et al. | 224/268 |

* cited by examiner

*Primary Examiner*—David Dunn
*Assistant Examiner*—Erika Garrett
(74) *Attorney, Agent, or Firm*—Kenneth E. Callahan

(57) ABSTRACT

A belt mounted infant carrier support device comprising a belt clip, an attached upward projecting hook-like protrusion upon which the lip of an infant carrier rests and a support cross member below the hook.

3 Claims, 5 Drawing Sheets

Front View

Oblique View

Infant Carrier Support Attached to Belt

Rear View

Side View

Front View

Perspective View

Grocery Carrier Supported by Belt Clip

Infant Carrier Supported by Belt Clip

Infant Carrier Extended

INFANT CARRIER SUPPORT

BACKGROUND OF THE INVENTION

The present invention relates generally to specialized carrier or transport devices, and in particular to a belt clip support mechanism for a hand-carried rigid container, such as an infant carrier seat or similar device for transporting the device from one location to another.

One type of common infant carrier (FIG. 1a) uses a rigid handle that attaches to the sides of the carrier and forms an arch above the carrier with a handgrip centered above the infant. This type of carrier is frequently combined with a base unit strapped to a car seat to form a combination car seat carrier. The handle for these carriers is perpendicular to the baby's body making it awkward to carry at the user's side. Because of the handle's orientation, the user's arm is twisted so the palm faces either forward or backward placing a strain on the elbow. Furthermore, the width of the carrier forces the hand to be held away from the body, increasing the strain on the elbow, shoulder, and back (FIGS. 1b and 1c). The weight of the baby plus the weight of the carrier would typically be in the 15 to 25 lb range. This requires substantial strength by the user and is only practical for a limited duration. A hand-carried basket found in grocery stores is a similar carrier device with similar problems. A device is needed to shift the weight to the hip region to reduce the strain on the arm and back while transporting the loaded carrier.

SUMMARY OF THE INVENTION

In a preferred embodiment, the present invention provides a simple and easily manufactured device to help support the weight of an infant carrier, grocery basket, or similar rigid carrier. The device clips on to a belt and has a hook-like protrusion upon which a lip of the carrier rests. Below the hook is a support cross member to further distribute the weight by pressing against the user's hip.

BRIEF DESCRIPTION OF THE DRAWINGS

The accompanying drawings illustrate by way of example the principles of the invention.

DETAILED DESCRIPTION

The present invention enhances the usefulness of infant carriers, hand-carried grocery baskets, and similar devices having a rigid or semi-rigid structure. The apparatus makes it easier for a person to transport such a carrier by shifting a significant amount of weight to the user's hip region.

Figure 1A:
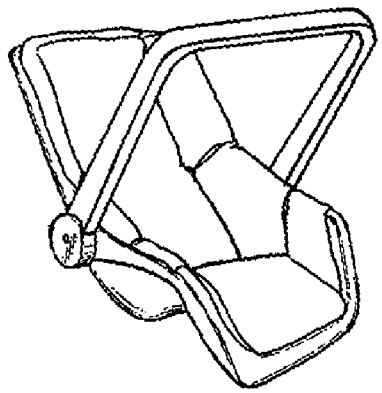
FIG. 1a shows a typical infant carrier.
Figure 1B:
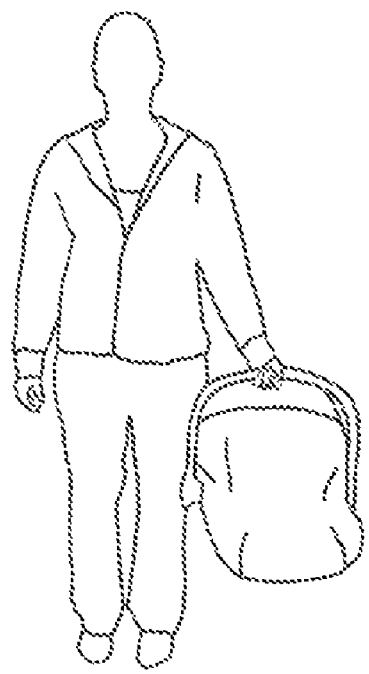
FIG. 1b shows a typical infant carrier in the transport position.
Figure 1C:
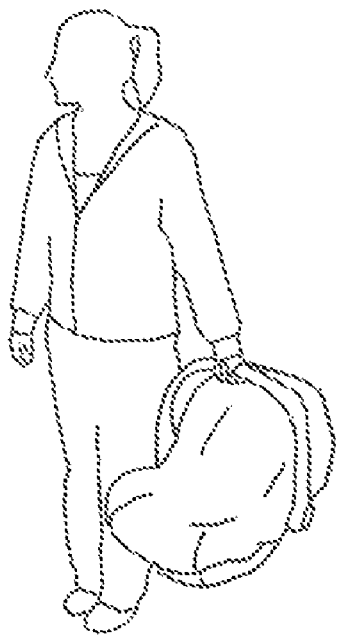
FIG. 1c is a oblique view of a typical infant carrier in the transport position.
Figure 6:
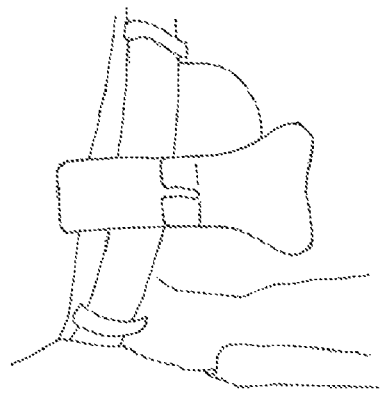
FIG. 6 shows the device attached to a belt.
Figure 5:
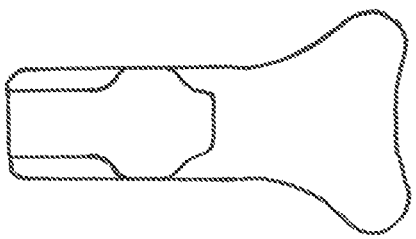
FIG. 5 is a rear view of the device.
Figure 4:
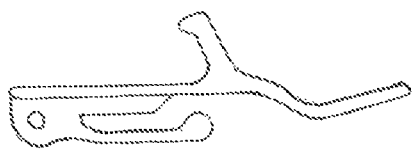
FIG. 4 is a side view of the device.
Figure 3:
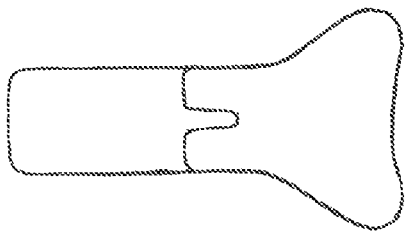
FIG. 3 is a front view of the device.
Figure 2:
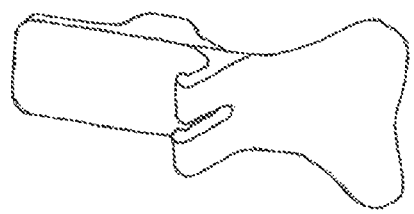
FIG. 2 is a perspective view of the infant carrier support.

The apparatus may be viewed as having three sections: a clip for attaching the device to a belt, a rigid hook attached to the lower exterior end of the belt clip, and a support cross member extending below the hook to further distribute the weight against the user's hip. The apparatus would, however, be manufactured as a single object of any lightweight malleable material, such as plastic. FIGS. 2-5 show a perspective view, a side view, and front and rear views of the apparatus, respectively. FIG. 6 shows the device attached to a belt.

Figure 7:
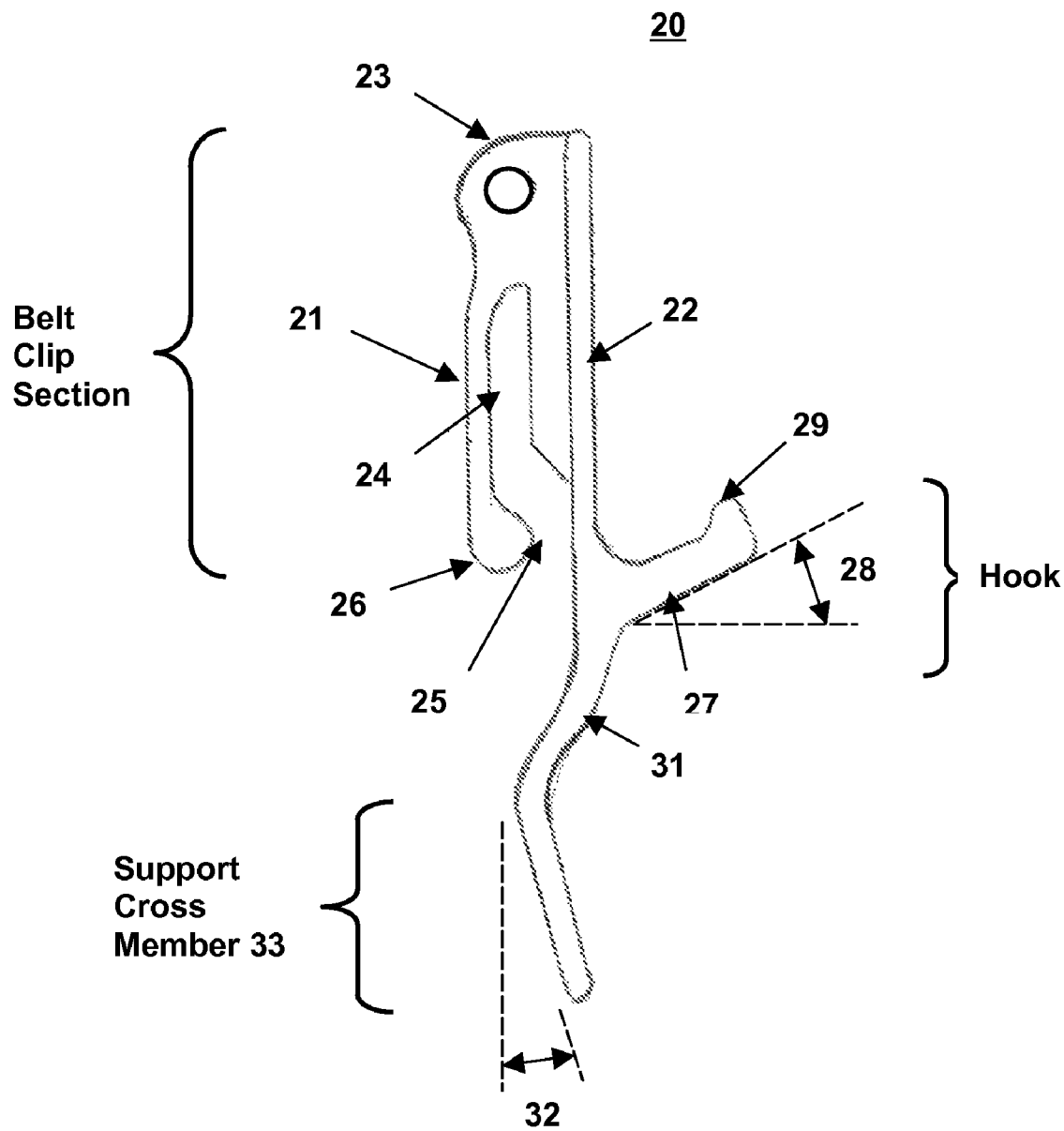
FIG. 7 is a detailed side view of the device.

A detailed side-view diagram of the infant carrier support is shown in FIG. 7. As depicted in this figure, the belt-clip section is generally in the shape of an inverted "U" that slips over the user's belt. The inner side to the belt clip 21 is about 2 to 3 inches in length while the outer side 22 in total extends 5 to 6 inches in length to encompass the hook and support cross member. The width of the belt clip section is about 1½ to 2 inches. The inner and outer sides of the belt clip are connected at their top ends 23 and open at their bottom ends to form a slot 24 to accommodate a belt. The slot is approximately 1¼ to 1¾ inches in height and approximately ¼ inch in width, sufficient to fit most belts. The entry to the slot 25 may be somewhat offset from the vertical axis of the slot. The inner side of the belt clip 21 at its bottom end may have a rounded knob 26. This knob 26 and the slot offset tend to secure the belt within the slot.

Figure 8:
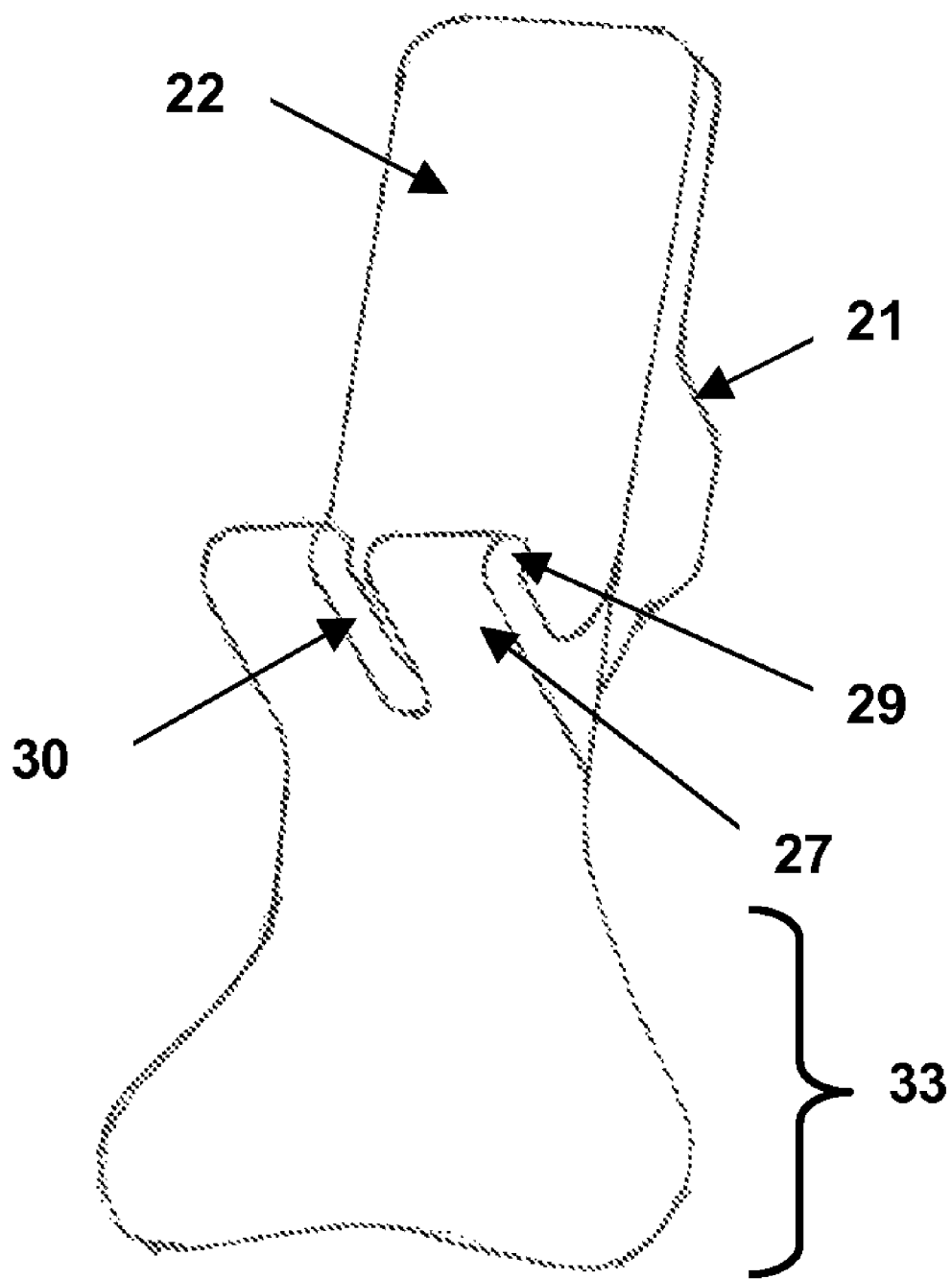
FIG. 8 is a detailed perspective view of the device.

The outer side of the belt clip 22 has a hook-like projection 27 attached to its outer surface at about half way down its length (about 3 inches from its top end). The hook-like projection 27 extends outwards approximately 1 inch at an upward angle 28 of from 5 to 30 degrees and preferably about 10 degrees with respect to the perpendicular to the outer side of the belt clip 22. The hook-like projection 27 ends in a rounded knob 29. The hook-like projection extends the width of the outer belt clip side 22 and further has an open slot 30 down the middle to accommodate a structural feature found on the outer lip of many infant carriers (see the detailed perspective view of FIG. 8). The upward angle 28 of the hook-like projection and the knob 29 at its end tend to secure the carrier device.

Below the hook-like projection 27, the outer side 22 is initially curved back toward the inner side 21 (31 in FIG. 7) and then is bent outwards at about a 10-degree angle (32 in FIG. 7) with respect to the plane of the upper portion of the outer belt clip side 22. The outward bent portion 33 is increased in width to form a support cross member. When the edge of an infant carrier or other device engages the hook, it not only presses downward on the belt but also tends to rotate the belt outwards. The support cross member then presses against the user's hip, further distributing the carrier weight to the hip region.

Figure 9C:
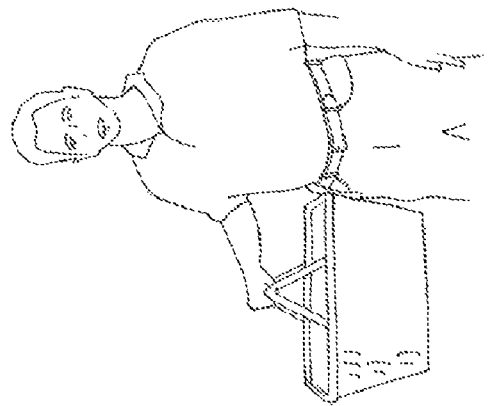
FIG. 9c is a diagram showing a grocery basket supported by the belt clip.
Figure 9B:
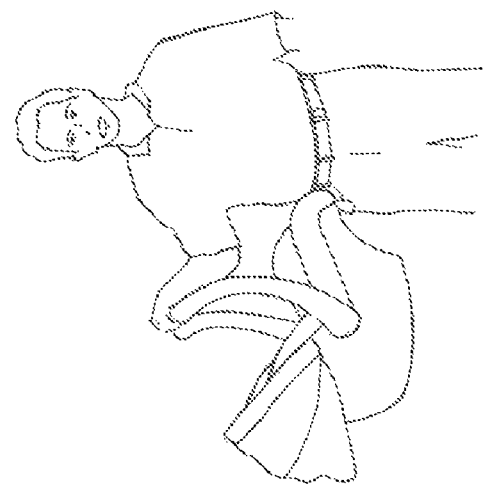
FIG. 9b is a diagram showing an infant carrier supported by the belt clip.
Figure 9A:
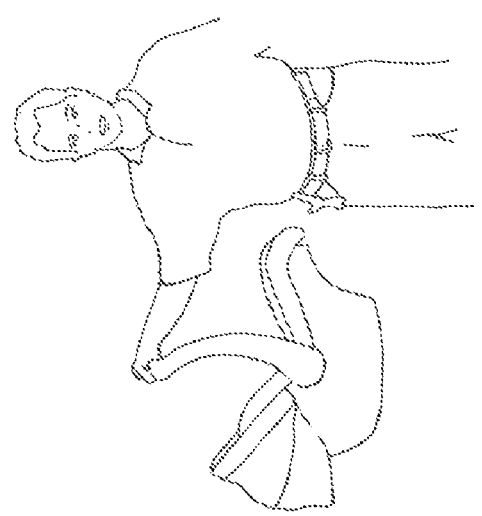
FIG. 9a is a diagram showing an infant carrier held out to the side.

FIG. 9 demonstrates a method of carrying an infant carrier seat or similar carrier by attaching it to a person's belt. FIG. 9a shows one method of carrying an infant seat without assistance. FIG. 9b shows a method of supporting an infant carrier seat in which the foot end of the infant carrier seat is attached to a person's belt, transferring a significant amount of weight to the hip region and reducing strain on the arm, back, and shoulder of the person carrying the seat. In this case, the means for attaching the carrier to a belt is to rest the foot edge of the infant carrier upon the hook-like projection of the belt clip. The side of the carrier could also be attached to the belt clip rather than the foot end as an alternative method of support. FIG. 9c shows a grocery carrier supported by the belt clip.

The invention claimed is:

1. A belt-mounted apparatus to facilitate carrying an infant carrier seat or similar rigid container, said apparatus comprising:
   a. An inverted U-shaped belt clip having an inner side and an outer side, said outer side extending approximately 2 to 3 times the length of said inner side, each side having a top and a bottom end, the top end of each side being connected together to form a slot to accommodate a belt;
   b. an outwardly-extending projection attached to said outer side approximately halfway between the top end and the bottom end of said outer side and extending outward from said outer side with an upward slant of 5 to 30 degrees from the perpendicular to said outer side and extending outward approximately one inch; and
   c. a support cross member comprised of that portion of said outer side below said outwardly-extending projection, said support cross member bending inward until it approximately touches a plane formed by said inner side and then bending outward about 10 degrees with the width of said support cross member increasing to approximately 1.5 to 2 times the width of the outer side above the outwardly-extending projection.

2. A belt-mounted apparatus to facilitate carrying an infant carrier seat or similar rigid container, said apparatus comprising:
   a. an inverted U-shaped belt clip having an inner side extending about 2 to 3 inches in length and an outer side extending about 5 to 6 inches in length, each side having a width of about 1 to 2 inches and having a top and a bottom end, the top end of each side being connected together to thereby form a slot to accommodate a belt;
   b. an outwardly-extending projection attached to said outer side approximately halfway between the top end and the bottom end of said outer side with an upward slant of 5 to 30 degrees from the perpendicular to said outer side and extending outward approximately one inch; and
   c. a support cross member comprised of that portion of said outer side below said projection, said support cross member bending inward until it approximately touches a plane formed by said inner side and then bending outward about 10 degrees with the width increasing to approximately 1.5 to 2 times the width of the outer side above the outwardly-extending projection.

3. The belt-mounted apparatus of claim 2 wherein said outwardly-extending projection extends the width of said outer side, has a rounded knob outer end, and a small slot dividing its width.

* * * * *